United States Patent
Bahrami et al.

(10) Patent No.: US 11,411,731 B2
(45) Date of Patent: Aug. 9, 2022

(54) SECURE API FLOW

(71) Applicant: FUJITSU LIMITED, Kawasaki (JP)

(72) Inventors: Mehdi Bahrami, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 16/559,405

(22) Filed: Sep. 3, 2019

(65) Prior Publication Data
US 2021/0067337 A1 Mar. 4, 2021

(51) Int. Cl.
H04L 9/30 (2006.01)
H04L 9/06 (2006.01)
H04L 9/08 (2006.01)
G06F 9/54 (2006.01)

(52) U.S. Cl.
CPC ............. *H04L 9/30* (2013.01); *H04L 9/06* (2013.01); *H04L 9/0861* (2013.01); *H04L 9/0894* (2013.01); *G06F 9/541* (2013.01)

(58) Field of Classification Search
CPC . H04L 9/30; H04L 9/06; H04L 9/0861; H04L 9/0894; G06F 9/541
USPC ........................................................ 380/30
See application file for complete search history.

(56) References Cited

U.S. PATENT DOCUMENTS

| | | |
|---|---|---|
| 5,674,887 A | 10/1997 | Blake et al. |
| 6,493,719 B1 | 12/2002 | Booth et al. |
| 7,072,946 B2 | 7/2006 | Shafer |
| 7,363,351 B1 | 4/2008 | Shafer |
| 7,370,075 B2 | 5/2008 | Farquharson et al. |
| 7,401,338 B1 | 7/2008 | Bowen et al. |
| 7,712,126 B2 | 5/2010 | Andersson et al. |
| 8,209,532 B2 | 6/2012 | Liu et al. |
| 8,311,225 B2 | 11/2012 | Singh et al. |
| 8,317,096 B2 | 11/2012 | Mysore |
| 9,060,239 B1 | 6/2015 | Sinha |
| 9,117,069 B2 | 8/2015 | Oliphant et al. |
| 9,356,916 B2 | 5/2016 | Kravitz et al. |
| 9,473,537 B2 | 10/2016 | Sinha et al. |
| 9,578,035 B2 | 2/2017 | Kravitz et al. |
| 9,699,218 B1 | 7/2017 | Hamilton, II et al. |
| 9,825,956 B2 | 11/2017 | Kelley et al. |
| 9,843,605 B1 | 12/2017 | Hamilton, II et al. |
| 10,044,701 B2 | 8/2018 | Blasi |
| 10,152,605 B2 | 12/2018 | Shetye |

(Continued)

OTHER PUBLICATIONS

IEEE 1363: "Standard Specifications for Public-Key Cryptography" Aug. 29, 2000.

(Continued)

*Primary Examiner* — Dant B Shaifer Harriman
(74) *Attorney, Agent, or Firm* — Maschoff Brennan

(57) ABSTRACT

A method may include obtaining input data for an application programming interface (API), and encrypting the input data for the API using a public key of a provider of the API. The method may also include transmitting, to an API management server, an API request that invokes the API, where the API request includes an API call for the API and the encrypted input data. The API request may be in a format such that the API management server is capable of performing API management services based on the API call but unable to decrypt the encrypted input data with the public key.

20 Claims, 7 Drawing Sheets

(56) References Cited

U.S. PATENT DOCUMENTS

| | | | | |
|---|---|---|---|---|
| 2004/0143736 | A1* | 7/2004 | Cross | G06F 16/10 |
| | | | | 713/165 |
| 2009/0310776 | A1* | 12/2009 | Kanemitsu | G06F 21/6218 |
| | | | | 706/47 |
| 2012/0179907 | A1* | 7/2012 | Byrd | H04L 9/3268 |
| | | | | 713/156 |
| 2014/0229729 | A1* | 8/2014 | Roth | H04L 63/0471 |
| | | | | 713/153 |
| 2016/0094551 | A1* | 3/2016 | Sugihara | H04L 63/10 |
| | | | | 726/7 |
| 2019/0052613 | A1* | 2/2019 | Karlsen | H04L 63/0478 |
| 2020/0295922 | A1* | 9/2020 | Weinzettl | G06F 21/6245 |
| 2020/0372174 | A1* | 11/2020 | Schenkein | H04L 63/0442 |

OTHER PUBLICATIONS

Tom Espiner "GCHQ pioneers on birth of public key crypto". (Oct. 26, 2010) www.zdnet.com.

Stallings, William (May 3, 1990). Cryptography and Network Security: Principles and Practice. Prentice Hall. p. 165. ISBN 9780138690175.

* cited by examiner

SECURE API FLOW

FIELD

Embodiments of the present disclosure relate to a secure application programming interface (API) flow.

BACKGROUND

APIs are used to permit access to one or more programming features from a secondary system. For example, a program operating on a client device may invoke an API during operation and may send an API request to an API provider. The API provider may process the API request, and send a response. One example of a frequently used API is the FACEBOOK® Login API, via which a third party verifies a user by sending their login credentials to the FACEBOOK® Login API provider along with the associated API call, which processes the API call and sends a response.

SUMMARY

One or more embodiments of the present disclosure may include a method that includes obtaining input data for an application programming interface (API), and encrypting the input data for the API using a public key of a provider of the API. The method may also include transmitting, to an API management server, an API request that invokes the API, where the API request includes an API call for the API and the encrypted input data. The API request may be in a format such that the API management server is capable of performing API management services based on the API call but unable to decrypt the encrypted input data with the public key.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1:
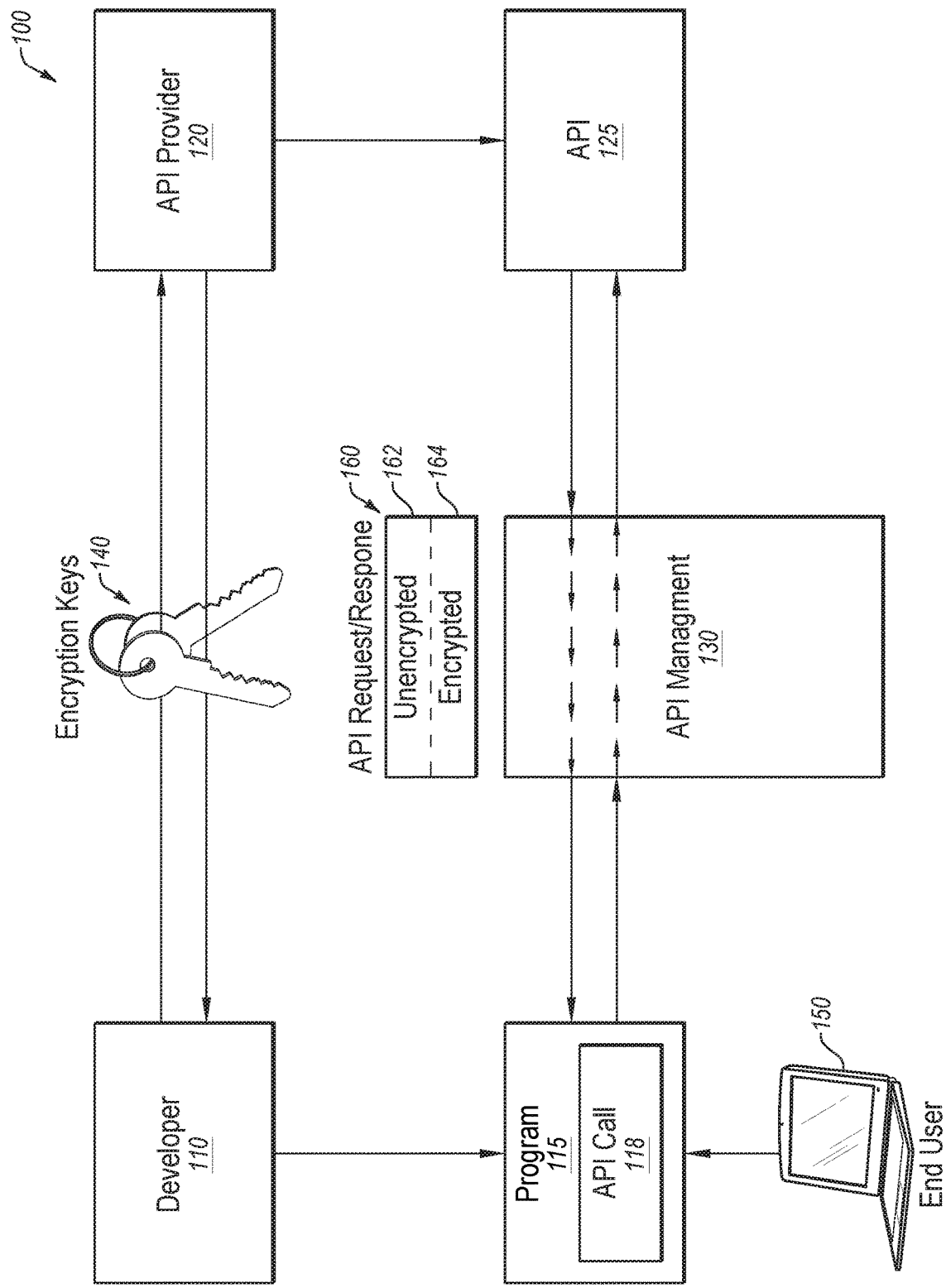
FIG. 1 is a diagram illustrating an example system that may be used for a secure API flow through API management services.

The present disclosure relates to the use of public and private key pairs to secure private data when using API management services. API management services may include a service that operates as a "middle-man" or go-between between clients of APIs and the API providers. For example, API management services may collect credentials and/or provide access to multiple APIs from multiple different API providers. By having access to the API management services, a user may access multiple APIs through a single system. However, when transmitting an API request through an API management service, the API request data may be exposed to the API management service. When submitting an API request, the request data may be sensitive data. For example, when submitting a request for the FACEBOOK® Login API, the request includes the password of the FACEBOOK® account of the user.

The present disclosure provides embodiments to provide a secure approach to interact with API management services, such as an API flow that passes through an API management service. A developer may exchange public keys with the API provider when requesting permission to use the API. The developer may incorporate the developer private key and the API provider public key to be used when software developed by the developer invokes the API call. For example, the input data and/or the developer data (such as the API access information) to be sent with the API request may be encrypted using the public key of the API provider. By encrypting the input data and/or the developer data, the API management service may still perform the expected management services on an API request without being able to observe or decrypt the input data. For example, metadata of the API request may be unencrypted. After performing the API management services, the API management server may forward the API request on to the API provider. The API provider may use its own private key to decrypt the input data and/or the developer data and use the input data to invoke the API using the input data. The response from the API may be encrypted using the public key of the developer. The response may be communicated in reverse, again with the API management server performing management services without being able to observe or decrypt the response data. The API client may decrypt the response using the private key of the developer. In this manner, both the input data to the API/the developer data and the response after invoking the API (e.g., the output of the API) are encrypted when passing through the API management services.

Certain embodiments of the present disclosure may provide improvements over previous iterations of API management services. For example, embodiments of the present disclosure may provide a more secure interaction between the API client and the API provider by permitting limited exposure of information. Additionally, the present disclosure may do so in a manner that still permits the API management services to be performed. As used herein, the term "API client" may refer to any entity, device, program, etc. that invokes an API call.

One or more example embodiments are explained with reference to the accompanying drawings.

FIG. 1 is a diagram illustrating an example system 100 that may be used for a secure API flow, in accordance with one or more embodiments of the present disclosure. The system 100 may include a developer 110 and an API provider 120. The developer 110 may develop a program 115 with an API call 118 that invokes an API 125 provided by the API provider 120. An API management service 130 may provide API management services. An end user device 150 may utilize the program 115 invoking the API call 118.

In operation, the developer 110 and the API provider 120 may exchange encryption keys 140. For example, the developer 110 may generate a private/public key pair and may provide the public key generated by the developer 110 to the API provider 120. In these and other embodiments, the developer 110 may utilize a private/public key pair generically for the developer 110, or may generate such pairs for a particular program (such as the program 115) or may generate such pairs for a particular end user or license of the program 115. As another example, the API provider 120 may generate a private/public key pair and may provide the public key generated by the API provider 120 to the developer 110. In these and other embodiments, the API provider 120 may utilize a private/public key pair generically for the API provider 120, or may generate such pairs for a particular API (such as the API 125) or may generate such pairs for a particular developer 110.

The developer 110 may utilize the encryption keys 140 when developing and/or implementing the program 115. In some embodiments, the program 115 may be coded such that when invoking the API call 118, the program 115 may encrypt input data to the API call 118 using the public key received by the developer 110 from the API provider 120. Additionally, the program 115 may encrypt developer data such as secure information to permit access to the API 125 by the developer 110 and/or the program 115. In doing so, the program 115 may encrypt a portion of an API request 160 (e.g., an encrypted portion 164) and may leave a portion of the API request 160 unencrypted (e.g., an unencrypted portion 162). Such unencrypted information may include metadata regarding the API request 160, such as where the request is to be routed, the HTTP verb function utilized, etc. In such a manner, the API management service 130 may perform management tasks on the API request 160 based on the unencrypted portion 162 observable by the API management service 130 while being unable to decrypt the encrypted portion without the private key of the API provider 120. After performing any management tasks, the API management service 130 may forward the API request 160 on to the API provider 120 such that the API 125 may process the input data.

In some embodiments, when receiving an API request 160 with the encrypted portion 164, the API provider 120 may decrypt the encrypted portion1 164 using the private key of the API provider 120. The communication and API management may occur in a similar manner in reverse based on the API response from the API 125 operating on the input data. For example, the API provider 120 may encrypt the response using the public key of the developer 110 and submit a response, leaving portions of the response unencrypted (e.g., metadata) such that the API management service 130 may perform management services on the response. After performing any management tasks, the API management service 130 may forward the response on to the program 115 such that the program 115 may utilize the response. For example, the program 115 may be coded such that the program 115 utilizes the private key of the developer 110 to decrypt the response.

In some embodiments, the present disclosure remains compatible with API authentication. For example, when the developer 110 provides its public key to the API provider 120, the API provider 120 may provide the developer 110 with a credential or other authenticating information permitting access to the API 125. In some embodiments, the authenticating information may be part of the encrypted portion 164 or the unencrypted portion 162. For example, for hypertext transfer protocol (HTTP) authentication, a username and password may be provided in the API request 160 to prove authenticity to the API provider 120. In such an example, the username and/or password may be included in the encrypted portion 164. Other examples of authentication include API keys, open authentication (OAuth, including OAuth version 1.0, 2.0, etc.).

In some embodiments, the API authenticating information is part of the encrypted portion 164 as part of the developer data. One or more other components of the developer data may be part of the encrypted portion 164, such as secure identifying information of the developer 110 and/or the program 115, etc.

The developer 110 may include any entity, party, or organization that may initiate permission for use of the API 125 from the API provider 120. For example, the developer 110 may include a software programmer, a web developer, an app developer, a hardware developer, etc. In these and other embodiments, the program 115 may include any executable instructions that invoke the API call 118. For example, the program 115 may include a software program, a web script, a hardware script, etc.

The end user device 150 may include any device that operates the program 115 to invoke the API call 118. For example, if the program 115 is a web script, the end user device 150 may be a device with a browser or other web accessing software that processes the script. As another example, if the program 115 is a hardware script (e.g., of a smart watch or other Internet-of-things (TOT) device), the end user device may be a device running the hardware script. In some embodiments, the end user device 150 may receive user input for the input data. For example, a user of the end user device 150 may input a text string, image, etc. to be used as the input data in the API request 160. In some embodiments, the developer 110 may operate as the end user device 150, such as during testing, initial implementation, development, etc.

The API provider 120 may include any entity, party, or organization that may develop, host, or otherwise provide access to APIs, such as the API 125. The API provider 120 may provide access to any number of APIs.

The encryption keys 140 may include any type of public/private key pairing and/or encryption algorithm used to secure communication. For example, the encryption keys 140 may work with secure shell (SSH) public key encryption. As another example, the encryption keys 140 may be derived and/or used in conjunction with Data Encryption Standard (DES), Triple DES, RSA, Blowfish, Twofish, Advanced Encryption Standard (AES), etc.

The API management service 130 may include any system, device, component, server, etc. configured to provide access to APIs and/or perform management tasks on traffic coming to or from or between the API provider 120 and/or the end user device 150. For example, the management tasks may include traffic control (e.g., limiting a number of API calls, controlling a rate at which API calls are submitted, etc.), management policy (e.g., classifying API requests, prioritizing API requests, etc.), security policy (e.g., verifying credentials of the end user device 150, etc.), etc.

While illustrated as being a "man-in-the-middle," in some embodiments, the API management service 130 may operate as part of the API client (e.g., may be coded as part of the program 115 such as a program call out to a third party API management service, a software package that is included in the program 115, etc.) such that the API provider 120 may be unaware that the program 115 is using the API management service 130. Additionally or alternatively, the API management service 130 may operate as part of the API provider 120 such that the program 115 and/or the developer 110 may be unaware that the API provider 120 is using the API management service 130. In some embodiments, the ability to make the other side unaware may be based on an address to which the API request/response 160 is directed (e.g., to the API management service 130 rather than the direct other party).

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described. For example, any of the components of FIG. 1 may be divided into additional or combined into fewer components.

Figure 2:
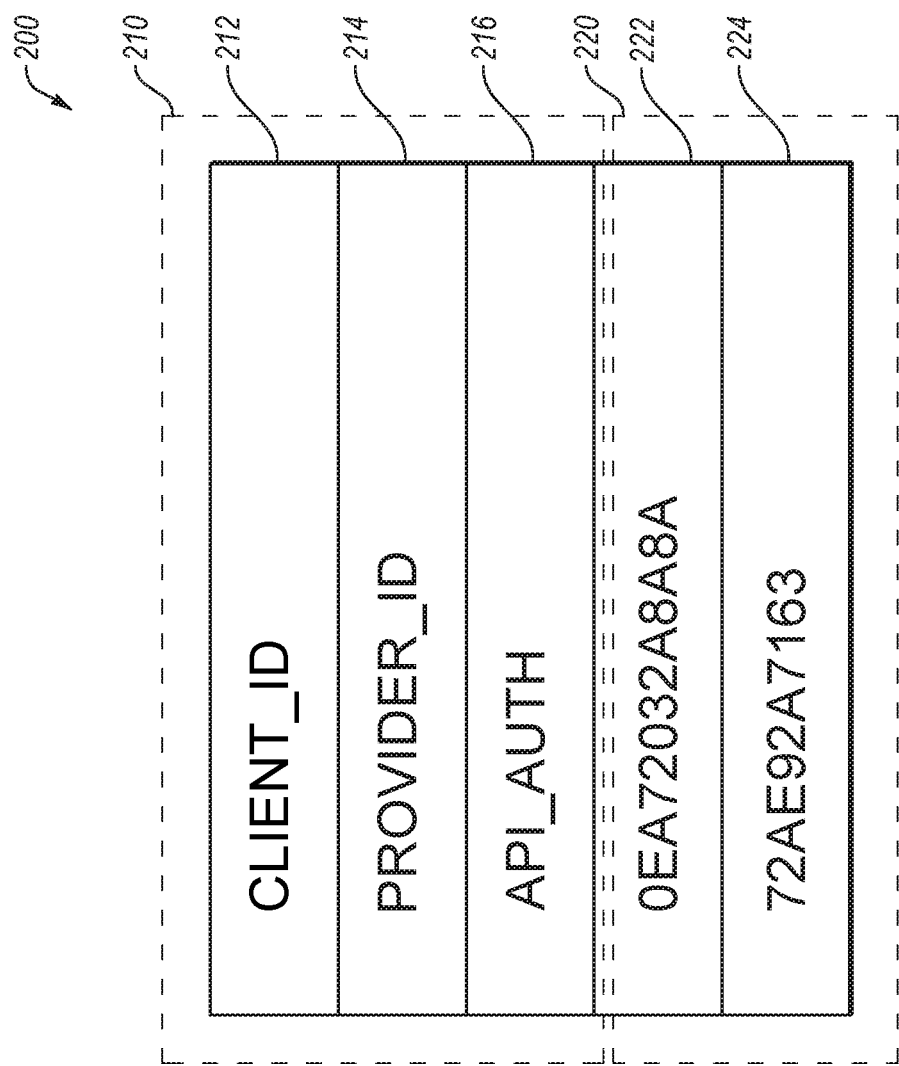
FIG. 2 illustrates an example API request used in a secure API flow.

FIG. 2 illustrates an example API request 200 used in a secure API flow, in accordance with one or more embodiments of the present disclosure. The API request 200 may be similar or comparable to the API request/response 160 of FIG. 1. As illustrated in FIG. 2, the API request 200 may include an unencrypted portion 210 and an encrypted portion 220. The unencrypted portion 210 may include the portion visible to an API management service during communication and the encrypted portion may include that portion that is viewable only if the private key is held by the entity (e.g., the API provider maintaining the private key associated with the public key used to encrypt the encrypted portion).

In some embodiments, the unencrypted portion 210 may include a client identifier field 212, a provider identifier field 214, and/or an authorization information field 216. In some embodiments, the client identifier field 212 may include an identifier by which the device, component, system, software, etc. and/or user invoking the API (referred to as the API client). Such an identifier may include an identifier that is non-sensitive (e.g., it is not harmful to the API client for the client identifier to be observed by potentially malicious parties). The client identifier within the client identifier field 212 may serve as an identifier or other location information for where the API response is to be sent. Examples of such identifiers may include an internet protocol (IP) address, a media access control (MAC) address, a user name, etc.

In some embodiments, the provider identifier field 214 may include an identifier by which the device, component, system, software, etc. and/or organization hosting or otherwise providing the API may be identified. Such an identifier may include an identifier that is non-sensitive. The API provider identifier within the provider identifier field 214 may serve as an identifier or other location information for where the API request is to be sent. Examples of such identifiers may include an IP address, a MAC address, a URL, an organization name, etc.

The authorization information field 216 may include any information used to verify the API client with the API service manager and/or the API provider. For example, the authorization information field 216 may include a token or other authentication information via which the API client may be validated by the API service manager. As another example, the authorization information field 216 may include authentication information used to authenticate the client with the API provider. In some embodiments, the authorization information field 216 may be included within the encrypted portion 220 rather than the unencrypted portion 210.

In some embodiments, the encrypted portion 220 may include sensitive authentication information 222 and/or a data payload 224. The sensitive authentication information 222 may include information via which the API client may authenticate itself with the API provider but which may be compromising if observed by potentially malicious parties (e.g., a password the API client uses to authenticate itself with the API provider). The data payload 224 may include any information provided as the input to the API to which the API request 200 is being sent. For example, the data payload 224 may include text, images, files, or any other data.

Modifications, additions, or omissions may be made to the API request 200 without departing from the scope of the disclosure. For example, the designations of different elements in the manner described is meant to help explain concepts described herein and is not limiting. Further, the API request 200 may include any number of other elements or may be implemented within other systems or contexts than those described. For example, the API request 200 may include any number or type of fields within either of the unencrypted portion 210 or the encrypted portion 220.

Figure 3:
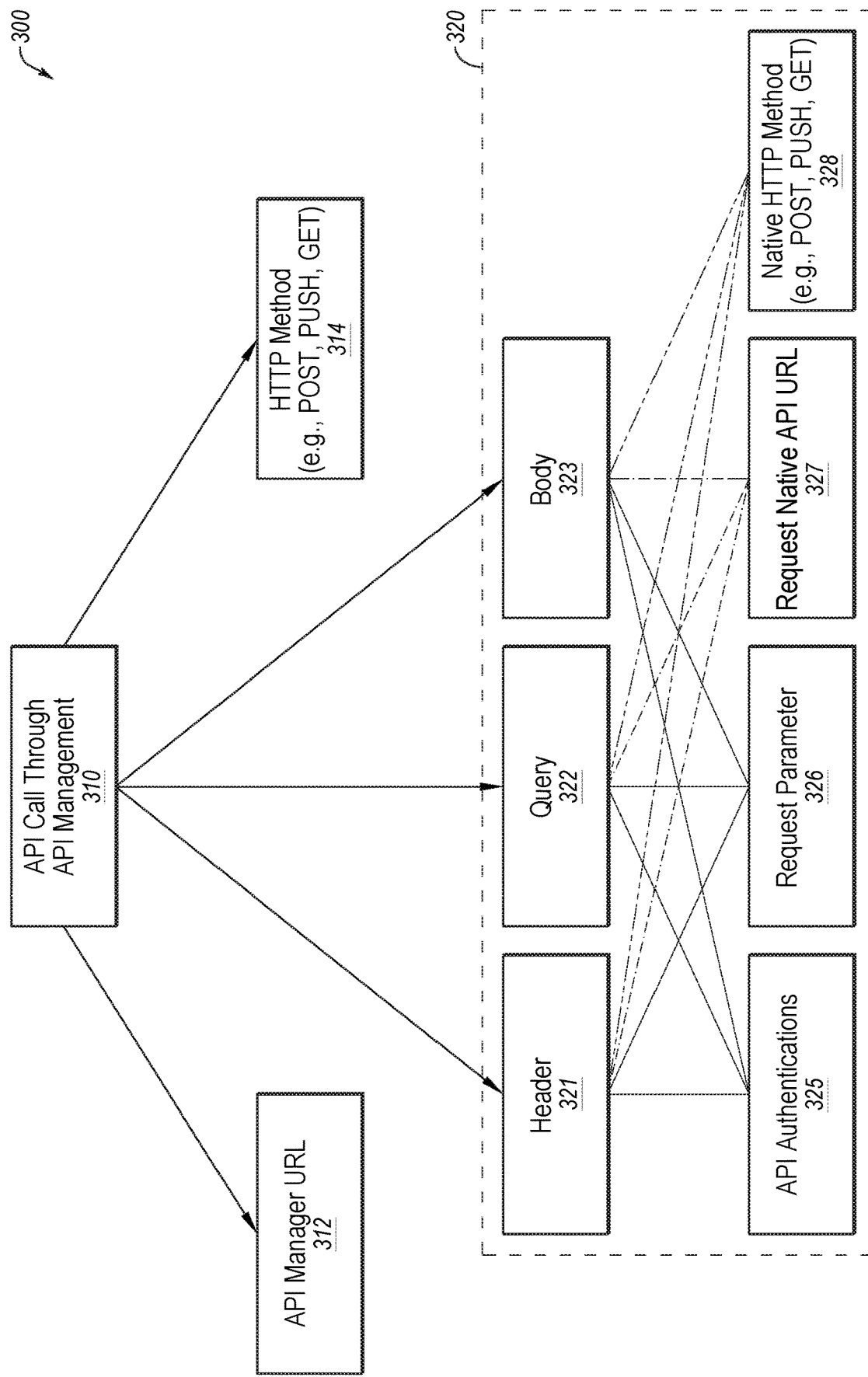
FIG. 3 illustrates an alternative view of an example API request used in a secure API flow.

FIG. 3 illustrates an alternative view of an example API request 300 used in a secure API flow, in accordance with one or more embodiments of the preset disclosure. The API request 300 illustrates a logical relationship between various portions of an API call routing through an API management service.

Block 310 illustrates an API call that is routed through an API management service. As indicated by the arrows extending from the block 310, the API request 300 may include an API manager URL 312 identifying where the API request 300 is to be initially routed. Additionally or alternatively, the API request 300 may include a hypertext transfer protocol (HTTP) method 314 indicative of which method the API management service may utilize to obtain the API request 300 (e.g., the request may be sent via an HTTP method of POST, PUSH, GET, etc.). For example, the PUSH command may automatically push the API request to the API management server at the API management URL 312. In some embodiments, the API request 300 may include authentication information authorizing the use of the API management service.

The dashed block 320 may represent the potentially encrypted portions of the native API call (e.g., the API call without the elements to be sent to the API management system). For example, the native API call may include a header 321, a query 322, and a body 323. Contained within some combination of the header 321, the query 322, and/or the body 323, the API request 300 may include API authentications 325 (e.g., information or credentials used during authentication of the API client with the API provider), one or more request parameters 326 (e.g., input data for the API), a request native API URL 32 (e.g., the URL for accessing the API being invoked), and/or a native HTTP method 328 (e.g., which method the API provider may utilize to obtain the API request 300).

Depending on the implementation of the API by the API provider and/or the implementation of the API management service, different data components of the native API request may reside in different components between the header 321, the query 322, and/or the body 323. For example, the header 321 may include the request native API URL 327 and the API authentications, the query 322 may include the native HTTP method 328, and the body 323 may include the request parameter 326. In these and other embodiments, any combination of the header 321, the query 322, and/or the body 323 may be encrypted. For example, the header 321 may be unencrypted and the query 322 and the body 324 may be encrypted.

Modifications, additions, or omissions may be made to the API request 300 without departing from the scope of the disclosure. For example, the designations of different elements in the manner described is meant to help explain concepts described herein and is not limiting. Further, the API request 300 may include any number of other elements or may be implemented within other systems or contexts than those described. For example, the API request 300 may include other components than those illustrated in FIG. 3.

Figure 4:
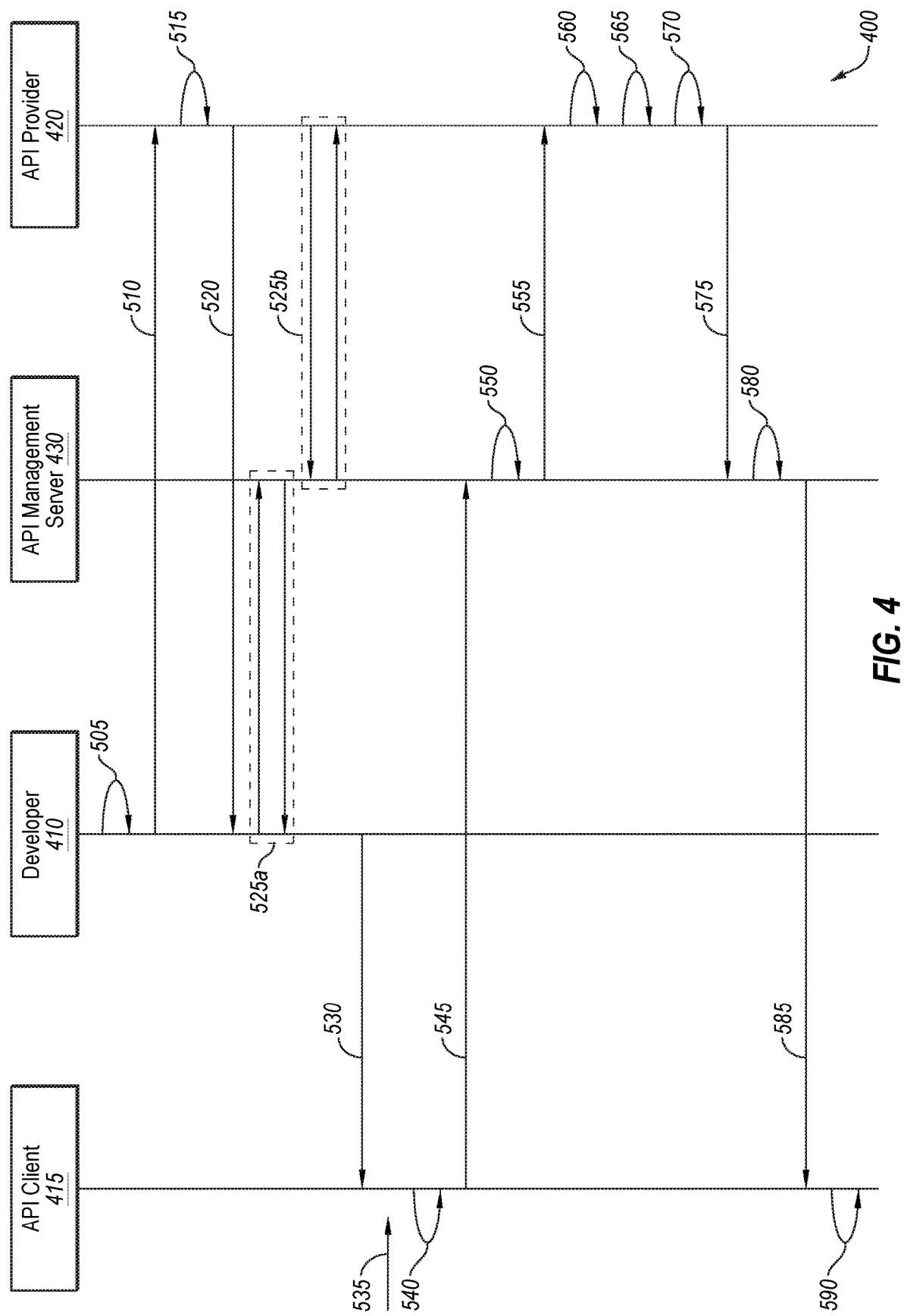
FIGS. 4, 5A and 5B illustrate an example swim-lane diagram and associated flowchart, respectively, of an example implementation of a secure API flow.
Figure 5A:
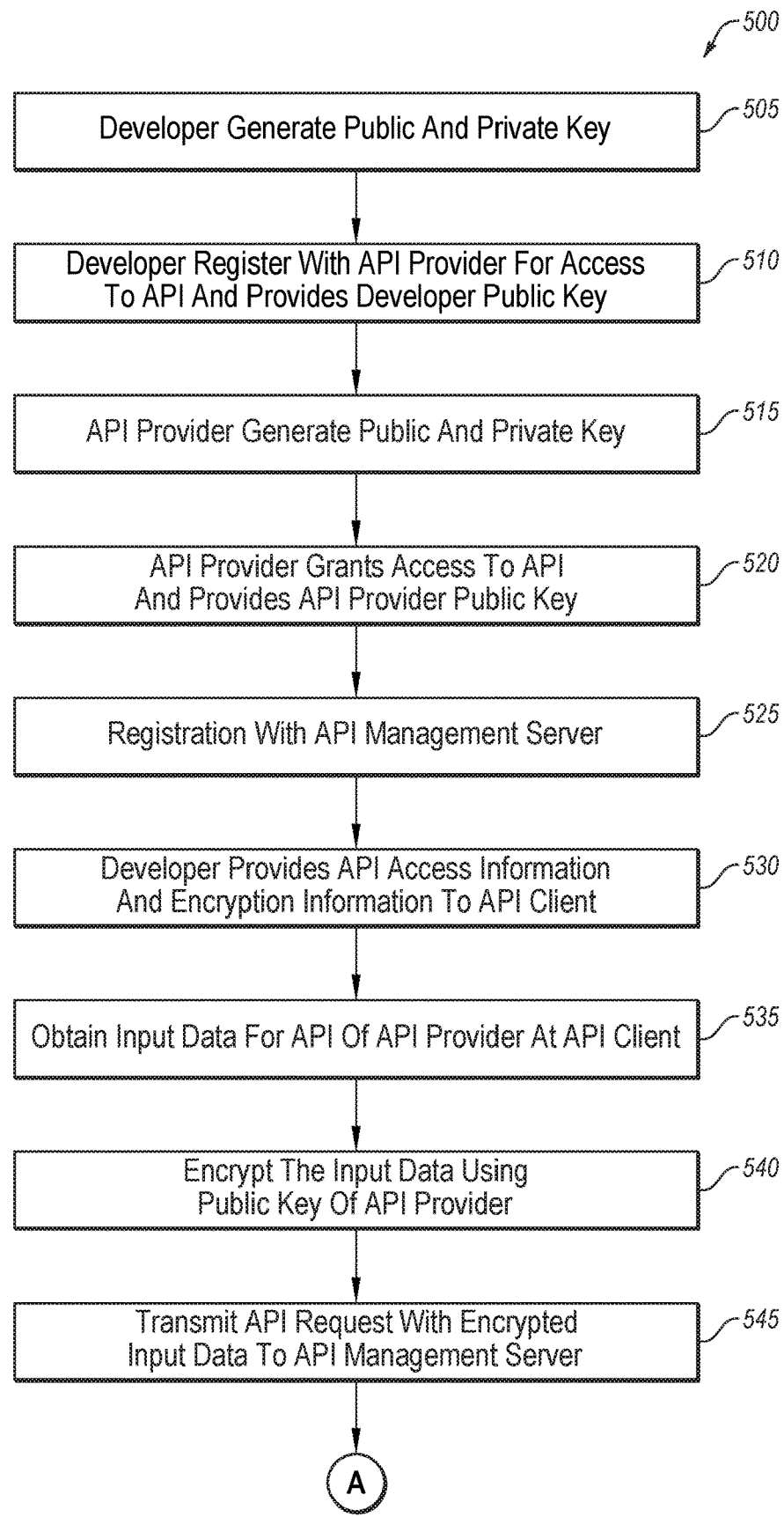
Figure 5B:
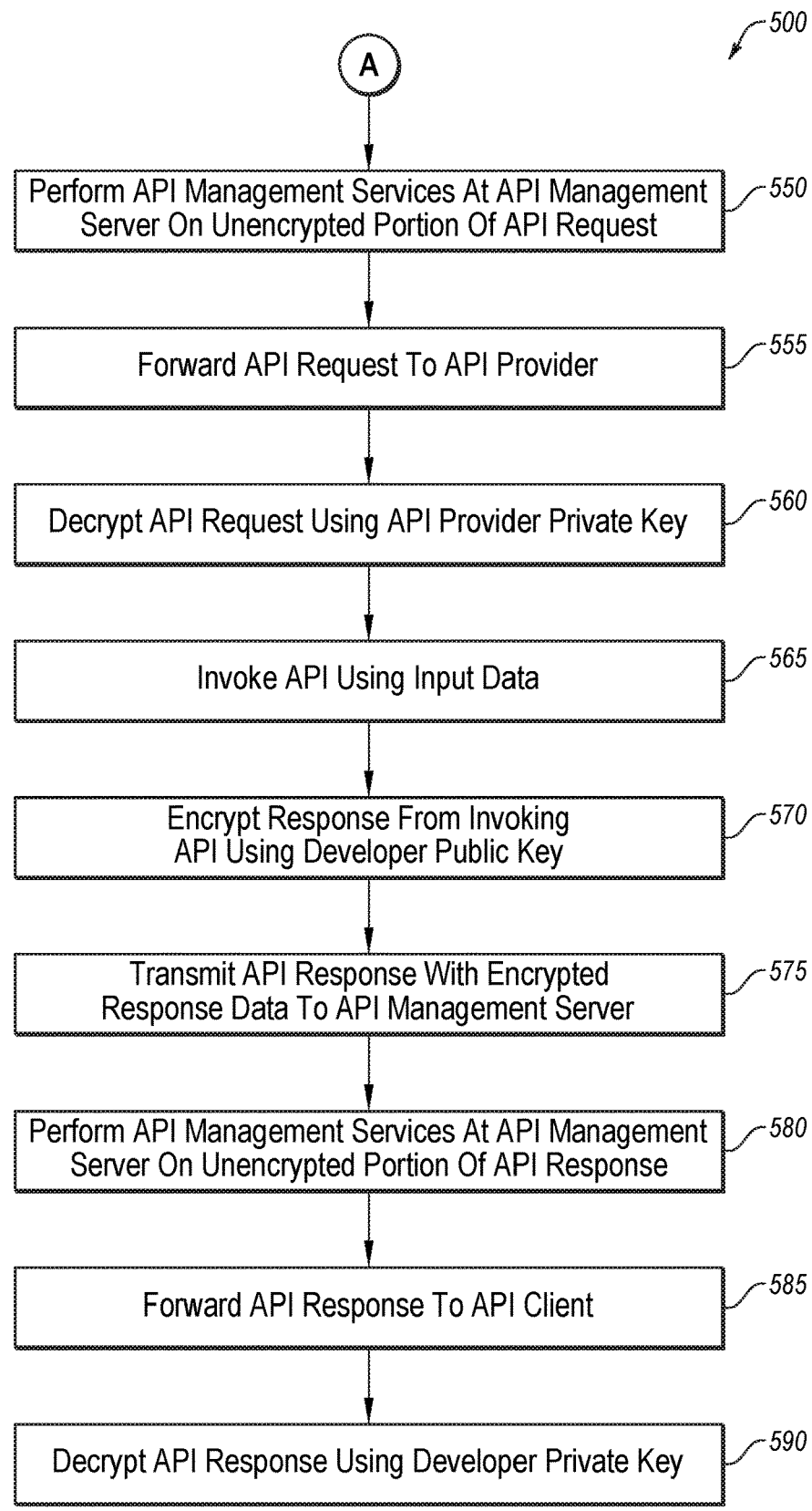

FIGS. 4, 5A and 5B illustrate an example swim-lane diagram 400 and associated flowchart of a method 500, respectively, of an example implementation of a secure API flow, in accordance with one or more embodiments of the present disclosure. FIG. 4 illustrates which entity between a developer 410, API provider 420, API management server 430, and API client 415, perform various operations (labeled 505-590) corresponding to the operations 505-590 illustrated in FIGS. 5A and 5B.

One or more operations of the swim-lane diagram 400 and/or the method 500 may be performed by a system or device, or combinations thereof, such as the system 100, the developer 110, the API provider 120, the API management service 130, and/or the end user 150. Although illustrated as discrete blocks, various blocks of the swim-lane diagram 400 and/or the method 500 may be divided into additional blocks, combined into fewer blocks, or eliminated, depending on the desired implementation. Additionally, while specific entities between the developer 410, API provider 420, API management server 430, and API client 415 that perform certain tasks, it will be appreciated that these are merely examples and different entities may perform the various actions and/or additional actions.

At block 505, the developer 410 may generate a public and a private key for encryption of messages to be used by the API client 415. In some circumstances, the private key may be specific to a particular API client such as the API client 415, or may be a private key used for all instances in which software developed by the developer is used. In these and other embodiments, the private key and the public key may be encoded into a software program developed by the developer 410 such that the private key and/or the public key are not accessible to a consumer of the software. Described mathematically:

$$KeyPair_{client}=(PK_C, PR_c)$$

where $KeyPair_{client}$ corresponds to the pair of keys generate for the client, and $PK_c$ is the public key generated by the developer 410 and $PR_c$ is the private key generated by the developer 410 for the API client 415.

At block 510, the developer 410 may submit a request to the API provider 420 requesting access to the API. In addition to a typical message requesting access, the developer 410 may include the public key generate at the block 505 (e.g., the public key $PK_c$) such that the API provider 420 may have access to the public key of the API client 415 generated by the developer 410. In these and other embodiments, the developer 410 may request an access token that may be included in a developed software program such that when the API is invoked, the access token is utilized and/or included in requests to the API provider when the developed software program is executing. Additionally or alternatively, any other type of API authentication approach may be utilized, such as a username/password, OAuth, OAuth2, digest, etc.

At block 515, the API provider 420 may generate a public key and a private key for encryption of messages to be used by the API provider 420. For example, the API provider 420 may utilize the public key and private key pair for encrypting and decrypting messages to and from any API clients, such as the API client 415. Described mathematically:

$$KeyPair_{MG}=(PK_{MG}, PR_{MG})$$

where $KeyPair_{MG}$ corresponds to the pair of keys generate by the API provider 420, and $PK_{MG}$ is the public key generated by the API provider 420 and $PR_{MG}$ is the private key generated by the API provider 420.

At block 520, the API provider 420 may grant access the developer 410 access to the API, and may provide the developer 410 the API provider public key generate at block 515. For example, the API provider 420 may transmit a message to the developer 410 that includes the public key ($PK_{MG}$) of the API provider 420 as well as any authentication information (e.g., an API authentication data structure) to be used by the developer 410 and/or the API client 415 when accessing the API.

At block 525, registration with the API management server may occur. As illustrated in FIG. 4, in an operation 525a, the developer 410 may register with the API management server 430, and the API management server 430 may provide an approval/acknowledgment of the registration with the API management server 430. Additionally or alternatively, in an operation 525b, the API provider 420 may register with the API management server 430, and the API management server 430 may provide a corresponding approval/acknowledgment of the registration with the API management server 430. In these and other embodiments, the registration may include information to authenticate the registering party, such as a subscription name, a subscription identifier, a primary key, a token, a user name of the developer 410/API provider 420 (e.g., email address), etc. In some embodiments, both operations 525a and 525b may be performed, such that the API provider 420 and the developer 410 may both register with API management server 430, which may include the same API management service or distinct API management services.

At block 530, the developer 410 may provide API access information and encryption information to the API client. For example, the developer 410 may distribute software that incorporates the API authenticating information and the public key of the API provider 420 such that the software may encrypt portions of API requests to the API provider 420. As another example, the software may encode the private key generated by the developer 410 such that the software may decrypt messages from the API provider 420. As a further example, the developer 410 may provide the API access information (e.g., API authentication tokens, etc.) and encryption information (e.g., private key $PR_C$ and public key $PK_{MG}$) as distinct components or credentials separate from the developed software. Such information, or other information specific to the developer 410 and/or used by the developer 410 may be characterized as developer data.

At block 535, the API client 415 may obtain input data for an API of the API provider 420. For example, when the distributed software is operating, it may request user input or may generate or otherwise obtain a value or other data to be submitted as an input to the API of the API provider 420 that is managed by the API management server 430.

At block 540, the input data of the block 535 may be encrypted using the public key of the API provider 420. For example, the distributed software may encrypt the input data and/or other components of the API request using $PK_{MG}$. Additionally, developer data (e.g., authentication information to permit access to the API such as that provided in the software distributed at the block 530) may be encrypted and included with the request/part of the encrypted portion of the request. Stated mathematically, the API client 415 (including the API client 415 via the software distributed by the developer 410) may perform the operation $$ENC(Req, PK_{MG}), \& \text{ MG API Auth}$$

where ENC may include a function to encrypt content (Req) using an encryption key ($PK_{MG}$), Req may represent the input data of the block 535 and/or other data of the API request to be encrypted, and MG API Auth may represent the authentication information used to access the API management server 430, such as the information provided at the block 525. In these and other embodiments, the API request may include both encrypted and unencrypted portions.

At block 545, an API request with the encrypted input data may be transmitted to the API management server 430. For example, the API client 415 may transmit the API request to the API management server 430 to perform management services on the API request.

At block 550, the API management server 430 may perform API management services on the API request based on the unencrypted portions of the API request. For example, the API management server 430 may perform traffic control, enforce a management policy, enforce a security policy, impose a limitation on the number of request, etc. In some embodiments, the API management server 430 may drop an API request (e.g., if a quota has been exceeded), may delay or postpone an API request, may prioritize one request over another, etc. In these and other embodiments, such tasks may be performed based on metadata of the API request that is unencrypted.

At block 555, the API management server 430 may forward the API request to the API provider 420.

At block 560, the API provider 420 may decrypt the API request using the private key of the API provider 420 (e.g., $PR_{MG}$). In some embodiments, there may be preliminary authorization performed on the API request before it is decrypted. The decryption may be stated mathematically as:

$$DEC(Req, PR_{MG})$$

where DEC may represent a decryption algorithm of the content Req using the key $PR_{MG}$.

At block 565, the API may be invoked using the input data obtained at the block 535, yielding an output.

At block 570, the API provider 420 may encrypt the response from invoking the API (e.g., the output of the API) using the public key provided by the developer 410 at the block 510. For example, stated mathematically:

$$ENC(Res, PK_C)$$

At block 575, the API response with the encrypted response data from the block 570 may be transmitted to the API management server 430 from the API provider 420. In these and other embodiments, the API response may include encrypted portions (e.g., the response generated by the API) as well as unencrypted portions (e.g., identifying information of where the response is to be sent).

At block 580, the API management server 430 may perform management services based on the unencrypted portions of the API response transmitted at block 575.

At block 585, the API response may be forwarded from the API management server 430 to the API client 415.

At block 590, the API response may be decrypted by the API client 415 using the private key $PR_C$. Stated mathematically, the API client 415 may perform the operation:

$$DEC(Req, PR_C)$$

By using such an approach, the API management server 430 may continue to perform management services on API request and response without having access to the actual content of the requests and responses.

Modifications, additions, or omissions may be made to the swim-lane diagram 400 and/or the method 500 without departing from the scope of the disclosure. For example, the operations of the swim-lane diagram 400 and/or the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6:
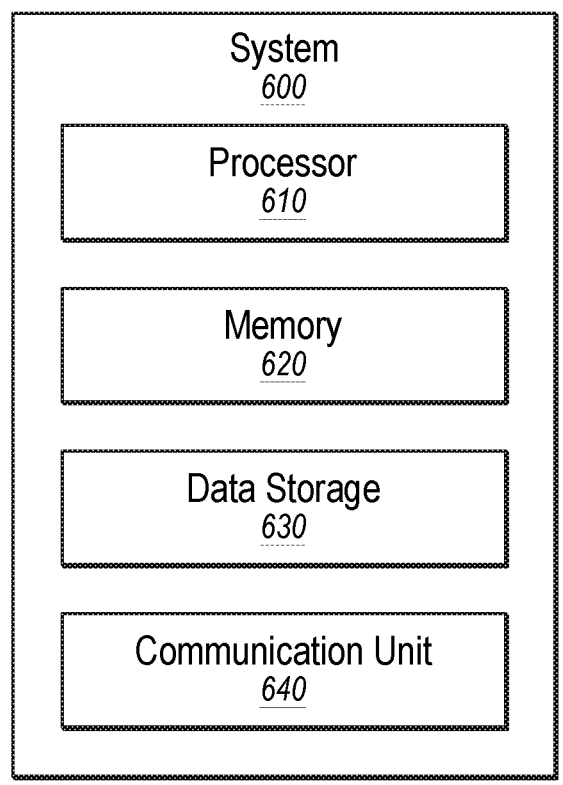
FIG. 6 illustrates an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the system 100 of FIG. 1 may be implemented as a computing system consistent with the computing system 600, including the developer 110, the API provider 120, the API management service 130, and/or the end user device 150.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform any of the operations illustrated in the swim-lane diagram 400 and/or the method 500 of FIGS. 4 and 5, respectively. For example, the processor 610 may obtain input data to an API request, and may encrypt that data using a public key of the API provider.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. For example, the memory 620 and/or the data storage 630 may store a one or more public or private keys. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skill in the art, after reviewing this disclosure, may recognize that modifications, additions, or omissions may be made to the system 600 without departing from the scope of the present disclosure. For example, the system 600 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   encrypting predetermined data to be part of an application programming interface (API) request, the predetermined data provided by a developer prior to obtaining input data, the predetermined data including API access information and encryption information;
   registering the developer and an API provider with an API management server;
   obtaining the input data for an API;
   encrypting the input data for the API using a public key of the API provider; and
   transmitting to the API management server the API request that invokes the API, the API request including an API call for the API and the encrypted input data, the API request in a format such that the API management server is capable of performing API management services based on the API call but unable to decrypt the encrypted input data with the public key.

2. The method of claim 1, further comprising receiving, from the API management server, a response to the API request, the response to the API request including an output of the API based on the input data, the output encrypted by the API provider using a public key of a client.

3. The method of claim 2, further comprising decrypting the response to the API request using a private key of the client.

4. The method of claim 1, wherein the API request further includes unencrypted data components including a client identifier, an API provider identifier, and an API management authorization structure.

5. The method of claim 1, wherein the public key of the provider is embedded within a computer program generating the API request such that the encryption of the input data occurs without user input.

6. The method of claim 1, wherein the API management services include at least one of traffic control, management policy enforcement, and security policy enforcement.

7. One or more non-transitory computer-readable media containing instructions which, in response to being executed by one or more processors, cause a system to perform operations, the operations comprising:
   encrypt predetermined data to be part of an application programming interface (API) request, the predetermined data provided by a developer prior to obtaining input data, the predetermined data including API access information and encryption information;
   register the developer and an API provider with an API management server;
   obtain the input data for an API;
   encrypt the input data for the API using a public key of the API provider; and
   direct a communication component to transmit, to the API management server, the API request that invokes the API, the API request including an API call for the API and the encrypted input data, the API request in a format such that the API management server is capable of performing API management services based on the API call but unable to decrypt the encrypted input data with the public key.

8. The one or more computer-readable media of claim 7, wherein the operations further comprise receive, from the API management server, a response to the API request, the response to the API request including an output of the API based on the input data, the output encrypted by the API provider using a public key of a client.

9. The one or more computer-readable media of claim 8, wherein the operations further comprise decrypt the response to the API request using a private key of the client.

10. The one or more computer-readable media of claim 7, wherein the API request includes unencrypted data components including a client identifier, an API provider identifier, and an API management authorization structure.

11. The one or more computer-readable media of claim 7, wherein the operations further comprise encrypt client data to be part of the API request.

12. The one or more computer-readable media of claim 7, wherein the public key of the provider is embedded within a computer program generating the API request such that the encryption of the input data occurs without user input.

13. The one or more computer-readable media of claim 7, wherein the API management services include at least one of traffic control, management policy enforcement, and security policy enforcement.

14. A system comprising:
   one or more processors; and
   one or more non-transitory computer-readable media containing instructions which, in response to being executed by the one or more processors, cause the system to perform operations, the operations comprising:
      encrypt predetermined data to be part of an application programming interface (API) request, the predetermined data provided by a developer prior to obtaining input data, the predetermined data including API access information and encryption information;
      register the developer and an API provider with an API management server;
      obtain the input data for an API;
      encrypt the input data for the API using a public key of a provider of the API provider; and
      direct a communication component to transmit, to the API management server, the API request that invokes the API, the API request including an API call for the API and the encrypted input data, the API request in a format such that the API management server is capable of performing API management services based on the API call but unable to decrypt the encrypted input data with the public key.

15. The system of claim 14, wherein the operations further comprise receive, from the API management server, a response to the API request, the response to the API request including an output of the API based on the input data, the output encrypted by the API provider using a public key of a client.

16. The system of claim 15, wherein the operations further comprise decrypt the response to the API request using a private key of the client.

17. The system of claim 14, wherein the API request further includes unencrypted data components including a client identifier, an API provider identifier, and an API management authorization structure.

18. The system of claim 14, wherein the public key of the provider is embedded within a computer program generating the API request such that the encryption of the input data occurs without user input.

19. The method of claim 1, wherein registering the developer with the API management server and registering the API provider with the API management service includes authentication information including one or more of a subscription name, a subscription identifier, a primary key, a token, or a user name.

20. The system of claim 14, wherein registering the developer with the API management server and registering the API provider with the API management service includes authentication information including one or more of a subscription name, a subscription identifier, a primary key, a token, or a user name.

\* \* \* \* \*